Figure 1:
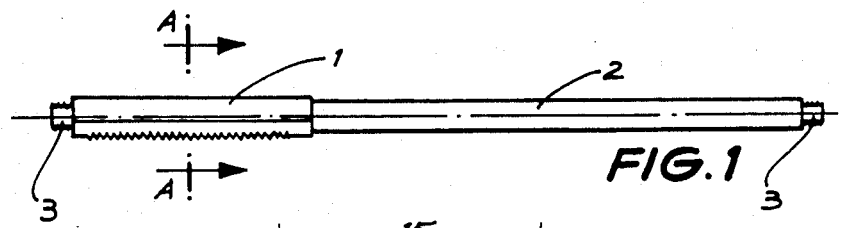
Figure 2:
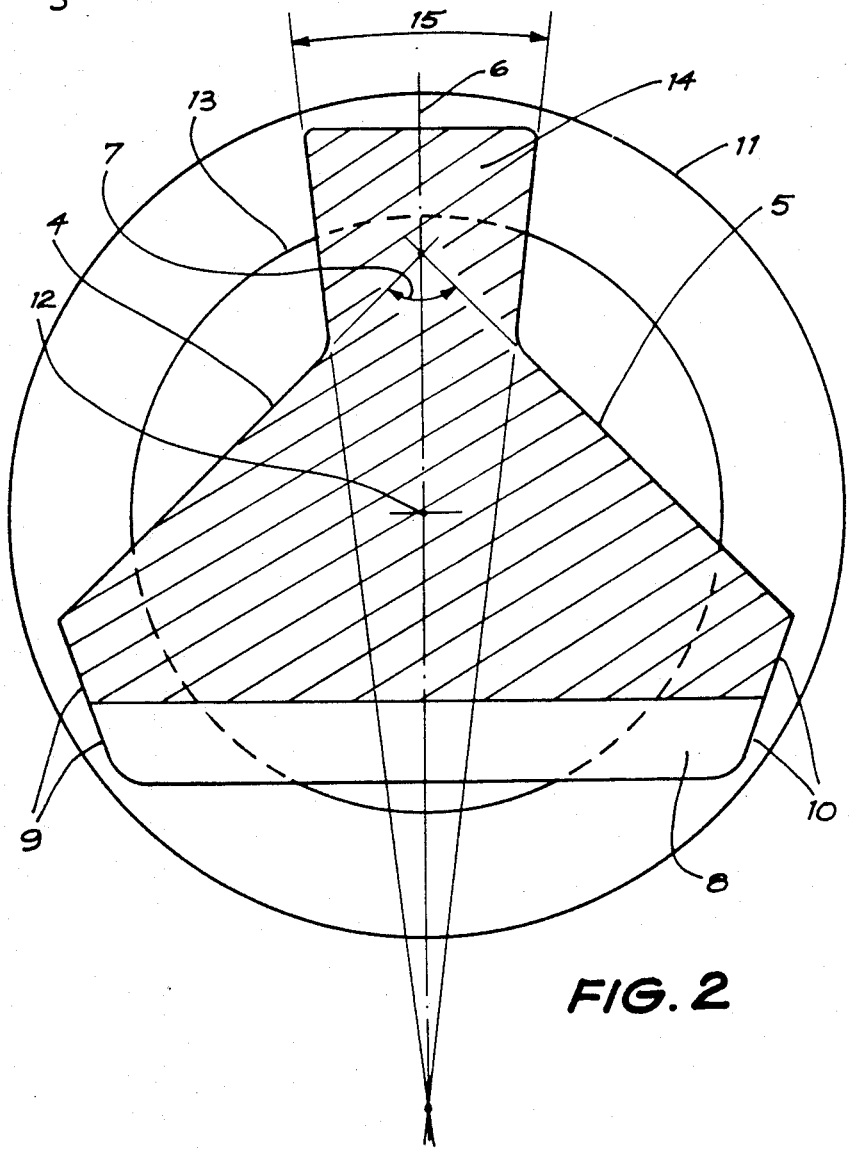
Figure 3:
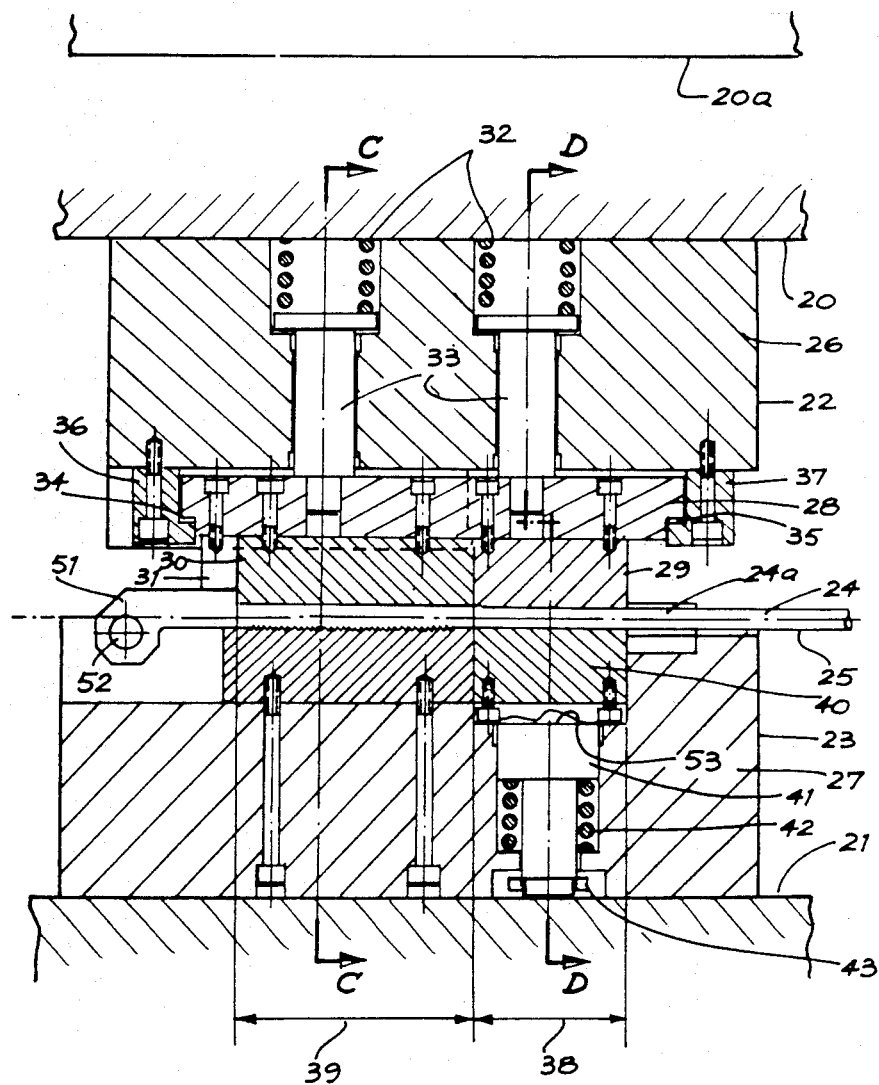
Figure 4:
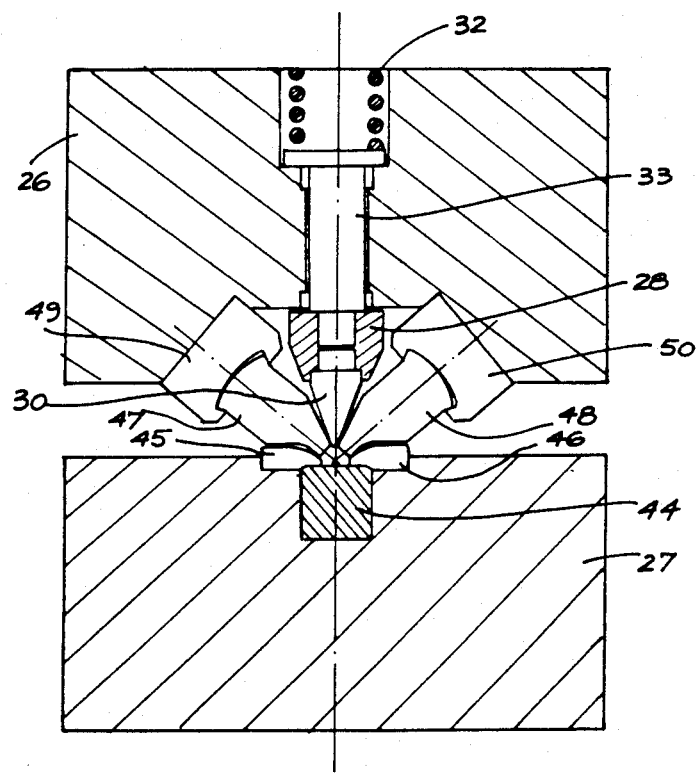

United States Patent [19]

Bishop et al.

[11] Patent Number: 4,715,210

[45] Date of Patent: Dec. 29, 1987

[54] METHOD FOR MAKING STEERING RACK BARS

[76] Inventors: Arthur E. Bishop, 17 Burton St., Mosman, New South Wales, Australia, 2088; Klaus J. Roeske, 54 Ponyara Rd., Beverley Hills, New South Wales, Australia; David W. Scott, 7 Solitary Pl., Ruse, New South Wales, Australia, 2560

[21] Appl. No.: 819,291

[22] Filed: Jan. 16, 1986

Related U.S. Application Data

[62] Division of Ser. No. 572,424, Jan. 4, 1984, Pat. No. 4,571,982.

[30] Foreign Application Priority Data

Jun. 4, 1982 [AU] Australia .............................. PF4309
Jun. 2, 1983 [WO] PCT Int'l Appl. .................... PCT/AU83/00073

[51] Int. Cl.[4] .......................... B21J 7/18; B21K 1/76; B21K 7/12
[52] U.S. Cl. .......................................... 72/400; 72/312; 72/353; 72/406; 72/469; 72/412; 29/159.2
[58] Field of Search ................. 72/400, 401, 353, 360, 72/313, 312, 394, 399, 406, 412, 469, 402; 29/159.2

[56] References Cited

U.S. PATENT DOCUMENTS

4,008,599  2/1977  Dohmann .......................... 29/159.2
4,133,221  1/1979  Clary ................................. 29/159.2

FOREIGN PATENT DOCUMENTS

62734    5/1981  Japan ................................. 29/159.2
2088256  6/1982  United Kingdom ................. 72/412

*Primary Examiner*—Daniel C. Crane
*Attorney, Agent, or Firm*—Hill, Van Santen, Steadman & Simpson

[57] ABSTRACT

A die for forming a Y-form rack portion of a steering rack bar from a blank by forging in which the die has at least three forming elements (44, 47, 48) relatively movable on application of forging pressure to the die to converge on a blank therein, a first of the forming elements (44) having in its cavities the shape of which corresponds to the shapes of the teeth to be formed, second and third forming elements (47, 48) having forming faces to form longitudinal guide faces (4, 5) on the Y-form rack portion on the side thereof opposite the teeth (8). The three forming elements (44, 47, 48) are shaped and arranged to move together to converge on the blank to transform it into the final form in such a manner as to inhibit escape of the material of the blank between the first and second or first and third forming elements up to substantially the last instant of closure of the die. It is preferred to provide a fourth forming element (30) between the second and third forming elements which serves to guide their movement and to control the shape of a surface of the rack portion (14) lying between the longitudinal guide faces (4, 5) and it is further preferred to impart to the second (47) and third (48) forming elements a rolling motion as they converge on the blank. The die is preferably constructed to be used in a single direction impact press. A method of making a steering rack bar having a Y-form rack portion and a cylindrical portion from a blank by forging is provided in which an accurately shaped and substantially cylindrical blank is first produced and the cylindrical portion of the blank is held while the Y-form rack portion is formed in a die of the configuration described above.

4 Claims, 10 Drawing Figures

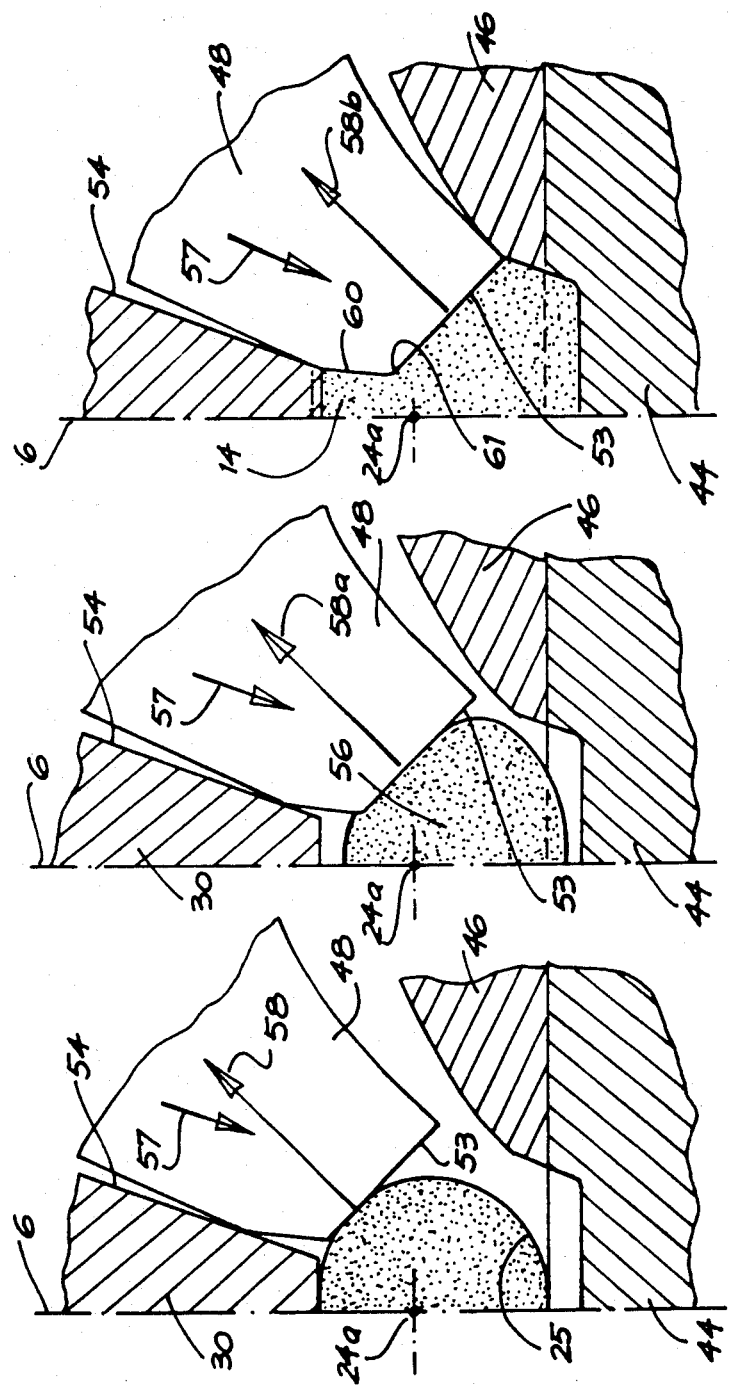

METHOD FOR MAKING STEERING RACK BARS

This is a division of application Ser. No. 572,424, filed Jan. 4, 1984, now U.S. Pat. No. 4,571,982.

This invention relates to steering rack bars for automobiles and their manufacture.

BACKGROUND ART

In the past, substantially all such racks have been made from a cylindrical bar of steel having cut therein transverse teeth over about one quarter of the length extending from one end. Typically a flat is first machined on the bar to a depth somewhat less than half the radius of the bar, and the teeth have a depth of about half that of the "flat". The remaining depth of section through the bar beneath the teeth is thereby reduced to about two-thirds of its diameter, so reducing its resistance to bending to less than half. Such racks are made of medium carbon steel and have their teeth induction hardened to improve their resistance to wear.

As installed in automobile steering gears, such rack bars are subject to severe bending loads because of forces transmitted from the suspension through the tie rods to the overhung ends of the rack bar where it protrudes through the steering gear housing. Such bending loads reach the same maximum value on the right side of the vehicle as on the left, and hence, as the rack bar is designed to have adequate strength to resist this bending on the toothed end, it follows that it will have double the required strength in the cylindrical end. As the latter comprises about three-quarters of the length of the rack bar, it is evident that such a rack is far heavier than necessary and wastes material.

The above shortcomings of such racks as commonly made may be overcome by employing a rack whose cross section resembles ther capital letter "Y", but with the area between the upper limbs filled in and teeth cut therein.

Such a section, the use of which is described in U.K. Patent No. 1,525,760, resembles a girder and is strong for its weight in bending, its strength being diminished less by the cutting of the teeth than in the case of round rack bars.

In the following text the term "Y form rack" will be used to describe a steering rack of the type just described. However the comparison to the capital letter "Y" should not be held to imply that the underside of the lmbs are necessarily flat or that there need to be a stem or tail there between. The lower surfaces may, for instance, be made convex or concave in section and the surface between them may have a smaller discontinuity than implied by the term "Y form".

The lower side of the "Y" limbs of such racks must act as guide surfaces in the same manner as the cylindrical surface of conventional racks, and hence must be smooth and accurately related to the pitch line of the teeth opposite within a tolerance of 0.025 mms or less. Machining of these "Y" faces to such a finish and close relationship to the juxtaposed teeth is difficult by known machining methods.

In another recent development in steering rack bars, the regularly spaced teeth hitherto used are replaced by teeth of irregular form and pitch as described in U.K. Patent No. 1,356,172, providing a variable steering ratio. Such teeth offer considerable advantages in reducing the parking effort, but cannot readily be produced by any known method such as gear cutting, broaching or grinding.

As neither of the foregoing developments are readily amenable to conventional machining methods, most racks made to date incorporating them have had to be made by highly unsuitable forging methods, as will be described.

Such racks do have the advantage that, in forging, the grain of the steel is caused to flow around the contours of the teeth and transverse to their length, so enhancing the rack tooth fatigue strength, as is well known in the art of gear forging.

U.K. Patent No. 2,056,894 purports to show how steering racks, including those incorporating variable ratio, may utilize the above-described beneficial effect of forging, and also reinforce such effect by arranging that the grain of the bar of the material from which the rack is made also lies in a direction transverse of the teeth.

In actual fact the beneficial effects of the forging of gear teeth and the rolling of threads, on the fatigue strength, are well known and occur irrespective of the direction of the original grain direction. In any case the grain direction of the bar described in the patent would result, inevitably, from any process of forging transverse teeth in a rack bar such as described in U.S. Pat. No. 3,550,418 or referred to in one method described in U.K. Patent No. 2026908.

However, there are several serious defects of the method of manufacturing racks described in U.K. Patent No. 2,056,894. For example, it is immediately apparent that, if a round bar were squeezed between close fitting die halves, one having the obverse of the tooth forms therein, the steel would start squeezing out horizontally between the approaching die faces to form "ribs" just as soon as forming of the teeth commenced. Such "ribs" on the sides of the rack would prevent the die closing. Some squeezing of the ribs might occur but this would cease, if forging hot, when the steel was chilled by the die, or, if forging cold, when the steel work-hardened.

In either case the volume of metal so wasted in a die of the proportions shown in the specification of that patent could amount to one-fifth or more of the original blank, making it impossible that the blank volume precisely equals the volume of the finished rack. This wastage would be even greater if the rack teeth conformed to the conventionally used proportions referred to earlier. The round-tipped rack teeth shown are completey impractical for use in steering racks. The prior machining of a flat on the rack bar and the removal of the side ribs both call for additional operations and wastage of material.

Figure 5:
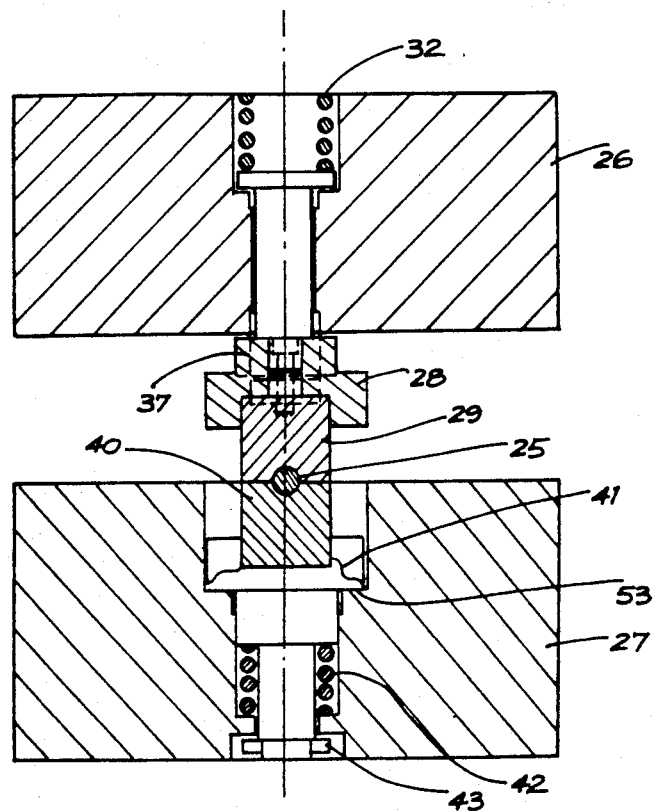
Figure 6:
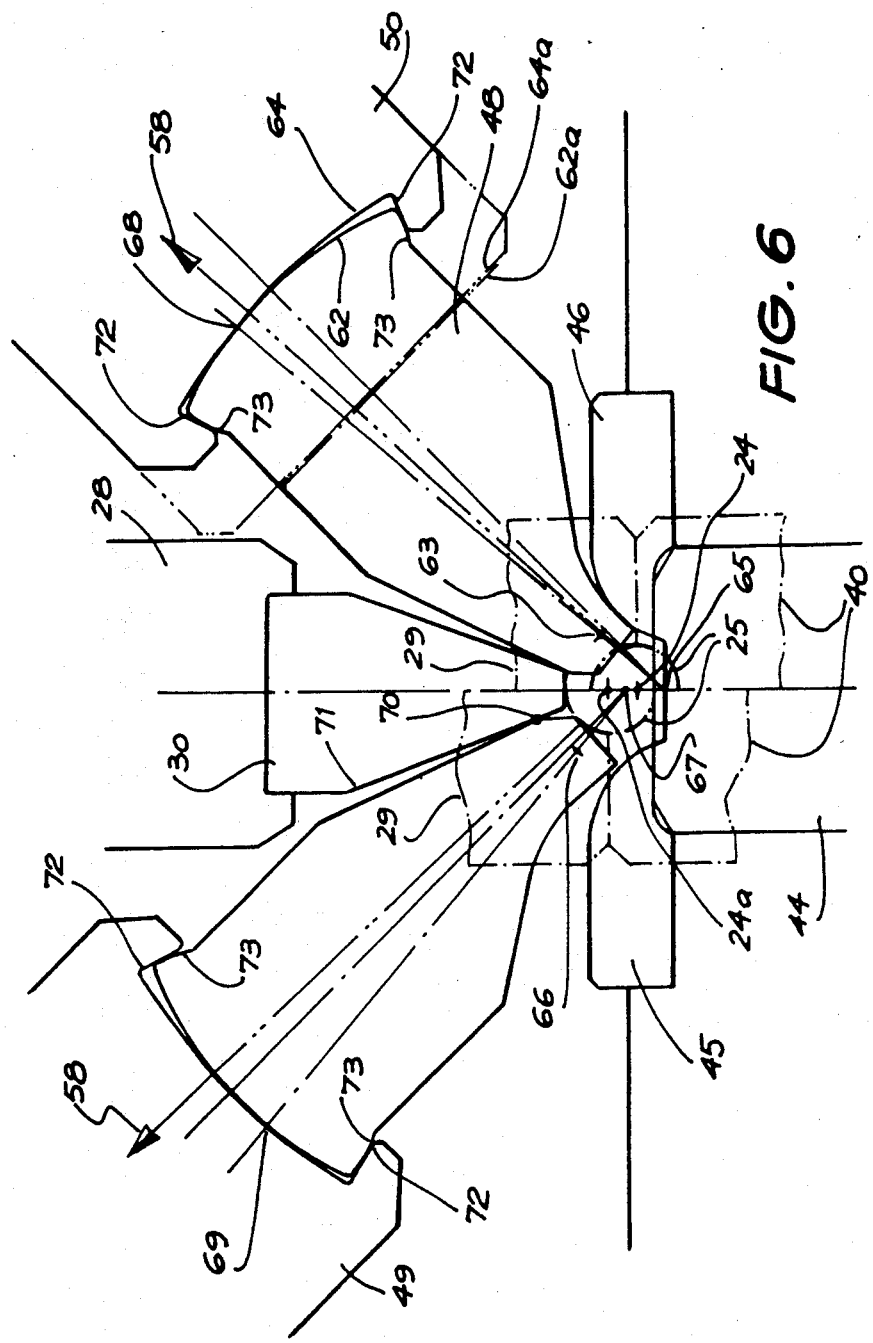
Figure 10:
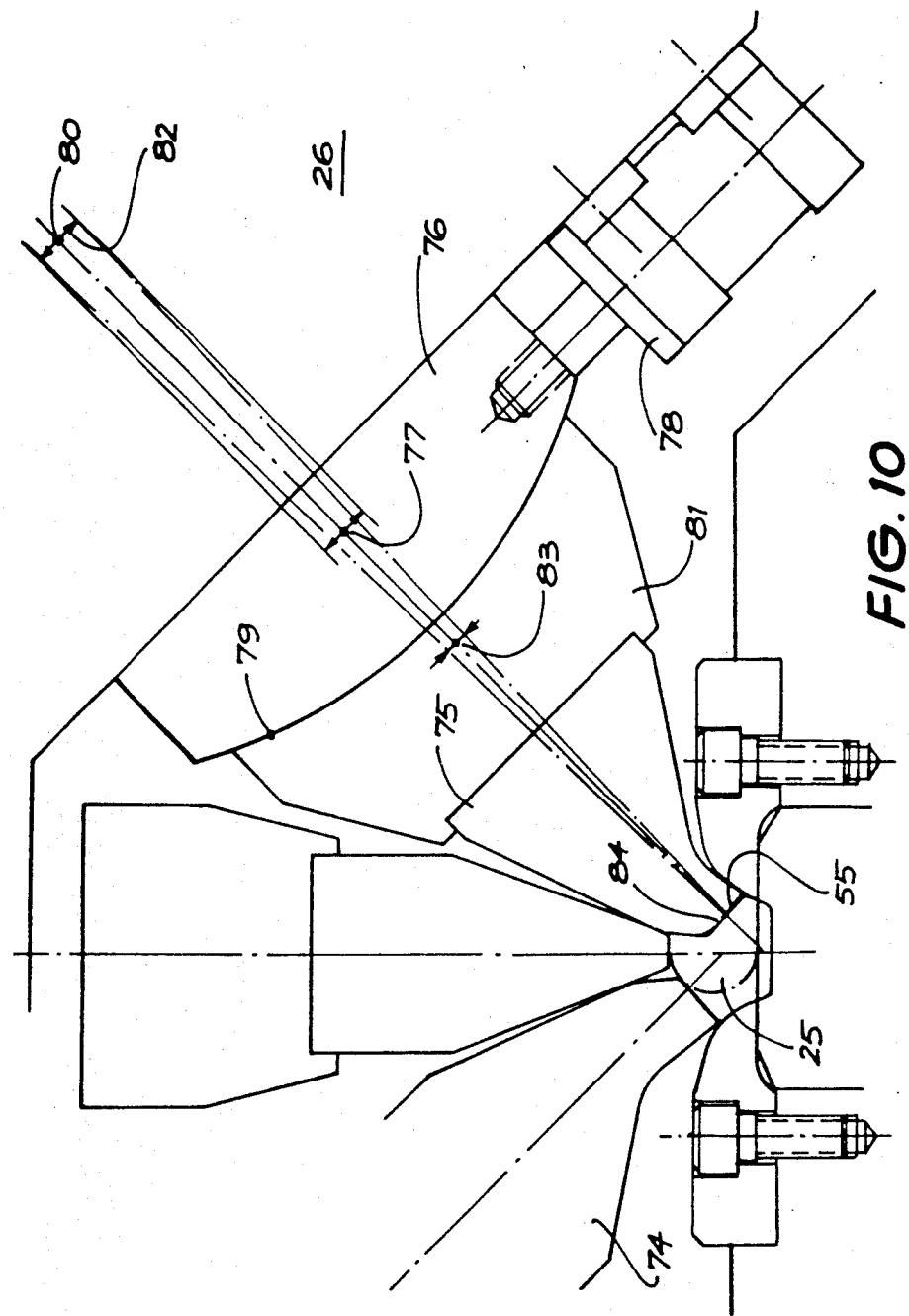

Referring now to U.K. Patent Application No. 2088256, this overcomes some of the limitations of the patent referred to above. For example, FIG. 5 shows that provision is made for the formation of side "ribs" by suitable "gutters" on each side of the longitudial axis of the main cavities of the die as is well known in the art of forging. Furthermore, the process recognises the impracticability of finish forming such teeth to the required accuracy in such dies, either cold or warm, but rather specifies an initial operation be carried out at the conventional forging temperature (generally over 1000° C.).

The patent specification recognises that distortion and scaling occur in forging at such temperatures, and therefore specifies that, after straightening and descaling operations, the rack bar in the toothed portion be cold coined to give the required precision. An additional disadvantage of this process, as described in that specification, is that, because of use of the high forging temperature, the core material of the racks becomes softened so that the forged blanks must be subsequently hardened and tempered in order to provide the necessary strength in the finished rack. Distortion inevitably occurs in such hardening and hence additional finishing operations are required in which the long end of the rack must be machined in exact alignment with the forged tooth end. The rib material which extends sideways from the root areas at each end of the tooth must be removed by trimming or cutting and hence the desirable grain direction wrapping around the root of the tooth is cut at the ends of the teeth where stresses tend to be highest and hence some of the fatigue strength attributable to forging is lost.

Some of the problems, for example, scaling, distortion and softening of the prior art just referred to may be overcome if forging occurs at lower temperatures, a process frequently referred to as warm forging, that is to say from about 550° C. to 750° C. A transition of the steel to the austenitic state, with accompanying dimensional changes, is thereby avoided. However, the steel is far less plastic at these temperatures than it would be at 1000° C. and hence it is more difficult to completely fill the teeth.

An additional problem of the prior art is the lack of adequate restraint of the steel blank and the escape of material which therefore occurs during the final closing of the die; this prevents the use of such lower forming temperatures. To make possible the forming and filling of the teeth at lower temperatures the use of a die chamber that is as nearly as possible, is desirable.

This problem is recognised in the art of designing forging dies where very complete fill of the die cavity is required as occurs, for example, in the hot forging of brass or die casting of aluminium. In such dies reduced loss of material and an increase of forming pressure is realised by providing a chamber like die cavity in which the final forming pressure is developed by a piston-style die configuration which avoids any entrapment of material between the closing die faces; "nipping" or trapping of material between opposing die faces during the last instance of closure is avoided.

However the pressures and temperatures involved in the forging of medium carbon steels at the intermediate range temperatures specified exclude the possibility of using the piston style die configuration referred to in those other arts referred to above, making them inappropriate to solving the present problem.

The present invention provides a die suited to the forming of steering rack bars of the configuration described which fulfills all the above needs. Furthermore the invention makes possible a low cost method of making such steering racks involving fewer steps and wasting less material than the prior art. Finally, the invention makes possible the manufacture of a rack of improved design incapable of being manufactured by any other known technique.

DISCLOSURE OF THE INVENTION

The present invention consists in a die for forming a Y-form rack portion of a steering rack bar from a blank by forging, the rack section having teeth formed on one face and on the opposite face thereof, at least two longitudinally extending guide faces, the die comprising a group of at least three forming elements relatively movable on application of forging pressure to the die to converge on a blank placed therein, a first of said forming elements having in it cavities the shape of which correspond to the shapes of the teeth to be formed, second and third forming elements having forming faces adapted to form the said longitudinal guide faces, the said three forming elements being shaped and arranged to move in such a manner to inhibit escape of the material of the blank between said first and second or first and third forming elements up to substantially the last instant of closure of the die.

The present invention further consists in a die as claimed in claim 1 wherein the second and third forming elements are symmetrically disposed about a longitudinal plane corresponding to the plane of symmetry of the rack portion to be formed and have between them a fourth forming element shaped and arranged to guide said second and third elements while converging on the blank and having a face arranged to form the surface of the rack portion lying between said guide faces.

The present invention still further consists in a Y-form rack bar when made in a die or by a method as defined in the last preceding paragraphs.

A die according to the invention ensures full containment of the blank material right up to the last instant of closure and forces it into the toothed cavity section of the die from at least two directions simultaneously, so preventing escape of material and focusing and intensifying the forming pressure within the toothed die cavity.

The die is suited to use in a single-direction impact press and can re-direct the impact in several directions simultaneously without loss due to friction.

The die preferably includes means to restrain the blank material in a gripper system which provides longitudinal restraint and ensures exact alignment of the formed rack section to the non-worked cylindrical blank section; thereby no further finish machining of the cylindrical end is required, saving material cost and manufacturing operations.

The die in a preferred form comprises in section a relatively fixed element containing cavities corresponding to the teeth of the rack including the oblique ends of the teeth, and movable elements having symmetrically disposed forming faces which converge towards the relatively fixed element and towards each other during the closing of the die.

In a further preferred refinement the two principal forming faces are incorporated in rolling die elements having convex, part-cylindrical surfaces on the ends thereof remote from the forming faces, which surfaces bear on concave recesses in the die bolster opposing that which carries the relatively fixed die element containing the teeth.

The die elements when opening after completion of forming, release the rack and allow it to be removed without the need for ejection pressures which cause distortion of the racks made in the prior art devices. This is possible even though the shape of the rack is such that the stem of the "Y" section has a reverse taper or dovetail section.

BRIEF DECRIPTION OF THE INVENTION

In order that the invention may be better understood and put into practice a preferred form thereof is hereinafter described by way of example, with reference to the accompanying drawings in which:

FIG. I illustrates a rack made according to the invention;

FIG. II is a cross sectional view of the rack on line A—A of FIG. I;

FIG. III is a sectional elevation of a die according to the invention, which is cross-hatched for clarity;

FIG. IV is a sectional view of the die on line C—C of FIG. III, also cross hatched;

FIG. V is a sectional view of the die on line D—D of FIG. III, also cross-hatched;

FIG. VI is an end view to an enlarged scale of the central part of FIG. IV;

FIG. VII, VIII and IX are scrap views to an enlarged scale of a part of FIG. VI showing progressive stages of forming; and FIG. X is a view similar to FIG. IV of an alternative form of construction of a die suitable for cold forming racks.

MODES FOR CARRYING OUT THE INVENTION

FIG. 1 shows a typical Y form rack bar made according to the invention comprising toothed portion 1 and cylindrical portion 2. Usually the ends of the rack are threaded as at 3 for the attachment of ball joints and tie rods. In another lesser-used type, tie rods are fastened to the rack by rubber bushed studs located near the vehicle centre line, for which purpose the cylindrical part may be locally enlarged, drilled and tapped. The method to be described applies also to the manufacture of such racks.

FIG. II shows the appearance in section of the toothed portion of the Y form rack seen at A—A of FIG. I and by diameter 13, the cylindrical section 2 of the rack bar.

Referring to FIG. II, opposing guide faces 4 and 5 are symmetrically disposed about vertical axis 6 at an included angle 7 of, say, 90°. Teeth 8 terminate in oblique faces 9 and 10 in order to make optimum use of the space available in the inside of the steering housing tube, indicated by circle 11, centered at 12. Such oblique ends of the teeth of the rack also serve to reduce the chance of breakage of the teeth adjacent their ends. The cylindrical portion 2 indicated by line circle 13 is also centered at 12. The diameter is chosen so that its sectional area is substantially identical to the mean sectional area of the toothed portion 1; the stem of the "Y", 14, preferably has a slight taper of its opposing flanks as indicated by angle 15, giving it a dovetail shape.

Many other configurations of the Y section are possible. For example, guide faces, 4 and 5 may be either convex or concave and arranged at an angle 7 other than 90 degrees, and stem 14 may have parallel sides or sides tapered opposite to that shown. Alternatively guide faces 4 and 5 may extend to meet or to form a flat or radius.

FIGS. III, IV and V show a preferred construction of a die for making racks of the type described, as installed in a press (not shown), having a movable platen 20 and fixed lower platen 21.

The die comprises an upper-half die 22 and a lower-half die 23 secured to the respective upper and lower platen 20, 21, of the press and in each of the three views are shown in the fully closed position as when rack bar 25 has been fully formed. The dies separate along axis 24 of rack 25 and upper platen 20 moves to raised position 20a for removal of the finished rack and insertion of a new blank to be formed.

The die has two zones along the length of the rack, a gripping zone 38, and a forming zone 39, (FIG. III).

As the upper-half die, 22, descends, gripping zone 38, a section of which is shown in FIG. V, first engages rack bar blank 25 after which the several elements of forming zone 39 shown in section in FIG. IV form the entire toothed end of the rack in one blow.

Gripping zone 38 comprises an upper gripper 29 and a lower gripper 40 each having grooves semi-circular in section engaging rack bar blank 25 and loaded respectively by springs 32 and 42.

Lower gripper 40 is secured to plunger 41 which is urged upwards by spring 42 housed in a chamber of lower bolster 27 of lower-half die 23.

Downward movement of plunger 41 is limited to the position shown because its shoulder strikes abutment 53 of the lower bolster, and upwards movement is limited by collar 43 striking a similar abutment. Typically such upward movement is about 6 mm and a gripping force is provided by spring 42.

Upper gripper 29 (FIG. III) is secured to plate 28 which is urged downwards by springs 32. Plate 28 also carries upper die member 30 and block 31. Plate 28 is guided in upper bolster 26 through the action of guide pins 33 slidably journalled in upper bolster 26. Springs 32 act on the enlarged heads of guide pin 33.

Plate 28 is limited in its downward travel by stop blocks 36 and 37 to about 8 mm as indicated by gaps 34 and 35 between plate 28 and respective stop blocks 36 and 37.

The force exerted by springs 32 is far in excess of that exerted by spring 42, so that as the die closes, grippers 29 and 40 will grip the blank 25 before significant forming commences.

Considering now a cross section of forming zone 39, (FIG. IV) it will be seen that in the fully closed position the rack is contained by four die elements; lower toothed die 44, hinged dies 47 and 48 and upper die member 30. Flank dies 45 and 46 may be made in one part with lower toothed die 44 but are here shown as being made separately for convenience of manufacture and servicing. Rolling dies 47 land 48 are supported by fulcrum blocks 49 and 50 secured to upper bolster 26.

The operation of these various elements of the forming zone 39 are best studied with reference to FIG. VI, which is an enlarged scrap view of part of FIG. IV, showing on the right side the position of the various die elements in the fully closed position as in FIGS. III, IV and V, and on the left side the position of the elements of the die as the forming in zone 39 commences. Half circles centred at 24a and 24 illustrate the corresponding initial and final positions of the cylindrical portion of the rack bar blank 25.

The rack forming sequence of events is as follows:

The cylindrical blank is loaded lengthwise into the open die resting on lower toothed die 44 and lower gripper 40 in its upper position and axially against end stop 51 which is pivotal about centre 52. As upper half 22 of the die descends upper gripper 29 first grips the cylindrical blank, (left-hand side FIG. VI) and as the die continues to close lower gripper 40 moves down (right-hand side FIG. VI) against the holding force of spring 42, until the shoulder of plunger 41 contacts the abutment 53 and the stop block 31, secured to plate 28, contacts end stop 51, thereby its downward motion is arrested. Upper die member 30 has now reached its fully closed position relative to lower toothed die 44.

At this instant the portion of blank 25 not requiring forming will be held in grippers 29 and 40 and will have its centre at 24, whereas that part of the blank 25 which is to be formed will be resting on the teeth of lower die 44 and have its centre at 24a. Hence an offset or joggle will have been formed in blank 25 at the junction of zones 38 and 39. (FIG. III).

The closing of the die is illustrated in FIGS. VII, VIII and IX.

FIG. VII corresponds to that shown on the left side of FIG. VI where the downward motion of plate 28 has been arrested and forming of a blank has just commenced. FIG. VIII corresponds to the mid stroke, where the cylindrical blank has been deformed approximately as indicated by the dotted area 56. FIG. IX corresponds to the final position to that shown on the right side of FIG. VI where forming is complete including forming of the teeth.

Note that the working face 53 of rolling die 48 travels in a direction 57 guided by face 54 of upper member 30 while the forming force reacts at right angles to the working face 53 as indicated by arrows 58, 58a and 58b.

An important aspect in the operation of the die is that, as the working faces of the rolling dies descend the metal that will form the stem 14 rises at about three times the rate of that at which they descend. Thus the taper on the flanks 60 (FIG. IX) of the stem 14 are formed without need for contact with the corresponding flanks of rolling dies, 47 and 48, the direction of force 58 is determined only by the contact with face 53 and not with stem 14 except only in a minor way by contact in the area of the fillet radius 61. At the last instant the rounded top of the stem will be flattened by contact with the lower face of upper die member 30. In the event that it is desired to form a rack having along its length varying tooth forms and hence varying means cross sectional area of the teeth, it is desirable to maintain a constant mean cross-sectional area of the forged rack. To this end it will be found convenient to vary the distance between the end of the stem and the centreline of the rack by imparting to upper-die 30 a suitable profile or contour along its length indicated by the chain dot line in FIG. IX. This will avoid the need during final closure of the die for material to be displaced along the axis of the rack to be formed.

Another important aspect of this method of forming is that rolling dies 48 and 47 concentrate or focus the forming pressure in the toothed cavities of lower die 44, the most important area of the die to fill. Because rolling die 48, FIG. IX, is in contact with the flank die 46 for the last part of its travel, there is no place for the metal being formed to escape and hence become entrapped between the two die elements 48 and 46. Thus the highly-desirable, fully contained die cavity is provided.

In a less preferred arrangement upper die member 30 may be shortened (while still acting as a guide for rolling dies 47, 48) so that the top of stem 14 remains rounded and is not flattened.

Now, as the direction of travel of the working face 53 of the rolling die is along the direction 57 and not along vertical axis 6 it must side-shift during forming as if, for example, the rolling die were attached to the upper bolster by a pivot pin. Such a pivot should lie, along line 58, when the die is approaching full closure, so as to avoid grate side loads being applied by rolling die 48 to either upper die member 30 or flank die 46.

However, this "Pivot pin" would be quite impractical because of the great magnitude of the forces involved, and instead, the rolling arrangement shown is provided.

Referring to FIG. VI (right hand side) rolling die 48 has a convex, part-cylindrical face 62, having a centre 63 engaged with a concave part-cylindrical seat 64 of the fulcrum block 50, having a centre 65. Contact between the face of 48 and seat of 50 must occur where the line joining 63 and 65 intersect them as at 68. The corresponding centres for the "up" position of the die are shown on the left side of FIG. VI and are indicated by 66 and 67, and in a similar manner contact between the seats will occur at 69. Very great loads can be carried between surfaces having nearly the same curvature. Note that, when loads are very high as when the die is fully closed, vector 58 very nearly passes through contact point 68 between faces 62 and 64, so that virtually all of the forming force is used usefully and not wasted in friction between rolling die 48 and the members which guide it, upper die member 30 and flank die 46. In the drawing the angle 68-65-58 is exaggerated for clarity. There is substantially no friction between rolling surfaces of the type shown.

When forming commences, as on the left side of FIG. VI, the fact that vector 58 passes considerably to the right of contact point 69 and tends to cause rolling die 47 to rotate anticlockwise does not matter, as in this instance the loads are quite low. This tendency will be resisted by the side load of die 47 contacting flank 71 of upper die member 30 as indicated at 70.

In practice, rolling dies 47 and 48 are maintained in their correct rolling relationship to fulcrum blocks 49 and 50 at all times by gear tooth-like abutments 72 and 73 of fulcrum blocks 49 and 50, which engage corresponding abutments of hinged dies 47 and 48. The weight of rolling dies 47 and 48 may tend make them depart from upper die member 30 in the open die position. A small spring (not shown) serves to ensure that contact as at 70 is maintained.

The above description covers a preferred embodiment of the invention. However, in another variation many of the advantages of the construction already described can be achieved by a design in which the side-shift movement of forming face 53 (right side of FIG. VI) can be achieved by sliding rather than rolling contact. For example, if rolling die 48 were terminated at line 62a normal to force direction 58, and arranged to slide on face 64a on a suitable low friction slideway rather than roll. However, even if the most efficient friction materials are used for such a slideway, because of the very large forces involved there will be considerable friction associated with the side-shift movement which is not present where a rolling contact is used as in the present preferred embodiment.

The construction illustrated in FIG. X of another preferred embodiment is intended for use in the manufacture of racks by cold working. In this construction die elements 47 and 48 hereinbefore referred to as the rolling dies are replaced by oscillatory dies 74 and 75. The particular feature of the arrangement however is the manner in which the working face of the die does not merely travel along line 57 as represented in FIG. VII, VIII and IX but, in addition, oscillates or rolls from side to side. As it may be desired that face 55 of the rack be a flat face, it follows that the working face 55 of oscillatory die 75 may be in the form, in section, of part of cylinder, or other appropriate form.

In the configuration shown in FIG. X fulcrum blocks 49 and 50 are omitted and in their place is installed a sliding block 76. This sliding block is capable of an oscillatory movement of typically around 15 mm. as indicated at 77, under the action of hydraulic cylinder 78 whose piston rod is attached to sliding block 76. The lower face of sliding block 76 is formed as part of a cylindrical surface 79, having a longitudinal axis centred at 80.

On this cylindrical surface is arranged to slide oscillatory die holder 81 to which is secured oscillatory die 75. Both the upper and lower surfaces of sliding block 76 are equipped with pockets into which is forced a fluid at extremely high pressure so that the free motion of the sliding block under the action of cylinder 78 is permitted without excessive friction.

In action, cylinder 78 oscillates the sliding block over distance 77, so causing the longitudinal axis of cylindrial surface 79 to oscillate over the distance 82 which is of the same magnitude as distance 77. It follows therefore that oscillatory die 75 oscillates through some angle 83 so that its working face which as stated earlier may be part of a cylinder, having a longitudinal axis centred at 80 rolls cyclically across the longitudinal guide surface of the rack being formed. Not shown on this drawing is the left hand of the die arrangement which is symmetrical with that just described and provision is made so that the oscillation of the left hand sliding block is co-ordinated with that of the right sliding block.

Typically the oscillation of sliding block 76 will occur at about 4 hertz. At the start of the operation a cylindrical blank 25 is inserted as shown on the left hand side of FIG. X and oscillation of the device is commenced. At the same time it is arranged that upper bolster 26 descends under the action of a hydraulic cylinder or in a press and therefore the blank 25 is successively deformed and rolled into the final shape as indicated on the right hand side of FIG. X. Because of the manner in which the steel is progressively being worked, rather than directly formed, a carbon steel, for example 1050 steel, may be formed in a die of this construction in a manner which may not be possible in the die described earlier because of the onset of work hardening typical of such materials. It will be appreciated however that the construction of such a die is significantly more complex and thus more costly than that described in connection with FIG. VI.

One particular feature of the preferred embodiments described is that the entire die can be placed in a conventional forging or hydraulic press and the angular motion of the die elements described is obtained by the mechanism of the die itself. However, alternatively a special press could be constructed in which the downward and inward travel of the presently rolling die elements is replaced by direct travel of the angled dies along, for example, line 57. Such a press might be particularly advantageous if it were of hydraulic operation in that it would be very compact and of relatively low cost providing that a number of such presses were to be made. On the other hand a forging press having two angled rams would be complicated and expensive machine.

While the die and the method of the invention have been described as applied to the production of a complete rack bar consisting of a cylindrical portion and an integral toothed portion they can be applied to the maufacture of a rack or toothed portion alone which is intended for attachment by welding to a cylindrical portion which can be in the form of a tube. For such a purpose the gripping zone of the die is not required.

It will be recognised by persons skilled in the art that numerous variations and modifications may be made to the invention as described above without departing from the spirit or scope of the invention as defined in the succeeding claims.

We claim:

1. A method of making a steering rack bar having a Y-form rack portion and a cylindrical portion from a blank by forging comprising the following steps:
   (a) producing an accurately shaped generally cylindrical blank the diameter of which is substantially equal to that of the cylindrical portion of the steering rack bar;
   (b) holding the cylindrical portion in the die of a press and subjecting a portion thereof to a forging operation to produce a Y-form rack portion, in a part of said die having a group of at least three relatively movable forming elements;
   (c) during said forging operation causing said elements to converge on the blank one of said elements acting to form teeth on a face thereof and at least two other of said elements acting to form two longitudinally extending guiding faces of the Y-form rack portion on an opposite face, the elements being moved in such a manner that as the die closes the said other elements effect a synchronized rolling motion while converging on the blank, the said other elements forcing material into cavities in the said one element corresponding in shape to the teeth to be formed, from two directions simultaneously thereby focusing and intensifying the forming pressure within said cavities, removing the finished rack bar from the die.

2. A method as claimed in claim 1 wherein a finished Y form rack portion is formed from the blank in a single forging operation.

3. A method as claimed in claim 1 wherein said forming elements are caused to oscillate about a predetermined angle as they converge on the blank.

4. A method as claimed in claim 1 wherein the closure of the die completely confines the material preventing its escape from any part of the die.

* * * * *